2,767,098
Patented Oct. 16, 1956

2,767,098
METHOD OF CONFECTION OF FROZEN COMESTIBLES

Ernest D. Fear, Kansas City, Mo., assignor to De-Raef Corporation, Kansas City, Mo., a corporation of Missouri No Drawing. Application July 28, 1953, Serial No. 370,863

7 Claims. (Cl. 99—136)

My invention relates to an improved method of confection of frozen comestibles and to a composition of matter for use in carrying out the process.

Ice cream is a leading food product in the United States. Approximately six hundred million gallons of it were consumed by the public in 1952. In the confection of ice cream a "mix" is first made up. A typical composition of an ice cream mix includes cream, milk, sugar, a small amount of gelatine, and in some cases, eggs. Flavoring, which may be vanilla, chocolate or fruits, can be added to the mix, as well as nuts or other sweetmeats.

In the confection of ice cream in the prior art, after these ingredients have been thoroughly agitated and pasteurized, the mix is processed through a homogenizer and cooled. The cooling proceeds at a low temperature which is above freezing and occupies a period of time. This "aging" at low temperature is necessary in order to enable the mix to acquire whipping qualities and may take from twelve to forty-eight hours. The aged mix is then fed to a freezer which includes a mechanical agitator which will whip the mix into a smooth, foamy mass and incorporate numerous minute air bubbles during the freezing and whipping process to form ice cream. The amount of air which is incorporated into the ice cream will increase the volume of ice cream with respect to the volume of the mix, thus reducing the specific gravity of the ice cream as compared with the mix. The increase in volume is called "overrun." For example, if a mix weighs 9.00 pounds per gallon and contains 40.00 percent solid material there will be 3.60 pounds of solids in a gallon of the mix. If this mix is whipped in a freezer to increase its volume to two gallons, the weight per gallon will drop from 9.00 pounds to 4.50 pounds and there will be only 1.80 pounds of solids in the ice cream. The mix then can be said to have an overrun of 100.00 percent.

The serum solids of the milk which comprise largely the protein, casein and lactose are supplied in part by milk and cream and in part by milk powder or condensed or evaporated milk. The protein constituents of the milk have colloidal properties which enable the mix to be whipped into ice cream. In ice cream the mix constituents form the continuous phase of an emulsion enclosing minute cells of air. The gelatinous material, which may be gum, gelatine, locust beans or other analogous material, is added to increase the stiffness of the whip and to enable more air to be incorporated. When ice cream contains too much gelatine it will not melt back to the natural consistency of the mix. This is always a sign of a poor or cheap grade of ice cream. Gelatines and like fillers are therefore not considered desirable in high quality ice cream.

It will be readily appreciated that as the overrun is increased, less solids will remain in the finished ice cream. Such ice cream will taste very light and fluffy but will melt down to reduced food value when eaten. To prevent deception of the public by selling them too much air incorporated in the ice cream, most states have laws requiring that ice cream must weigh a certain minimum weight per gallon, varying between 4.00 pounds per gallon and 4.75 pounds per gallon. In California, for example, the State law provides that the ice cream must contain 1.60 pounds of total solids per gallon of ice cream, thus eliminating overrun as a factor. It will readily be seen that if the solids content of the original mix was more than 3.20 pounds per gallon, an overrun of more than 100.00 percent could be made and sold in California. California, however, requires that the ice cream contain 10.00 percent butter fat, and this content is also specified by many State laws. In Kansas, ice cream must weigh 4.50 pounds per gallon, and in a great many states the weight is specified as not less than 4.50 pounds per gallon. It will be appreciated that the specification of a total solids content eliminates overrun as a factor. Some State laws, however, specify the maximum amount of overrun. In Illinois, for example, it is provided by law that no ice cream shall have an overrun of more than 100.00 percent.

The expensive ingredient in ice cream is the butter fat. This is the lightest ingredient in that its specific gravity, while close to unity, is still less than 1.00. In order to maintain the weight of ice cream per gallon, therefore, when the butter fat content is high more serum solids must be added if a satisfactory ice cream is to be produced. The solids content cannot be built up by adding sugar since the quantity of sugar is fixed by the desired sweetness of the finished ice cream. Some small control is afforded by the fact that dextrose is not as sweet to the taste as cane or beet sugar. Ice cream must be made with a minimum amount of overrun if we are not to have a soggy, heavy ice cream. It follows, therefore, that an ice cream high in butter fat is usually a rich, excellent ice cream.

Other edible fats can be used instead of butter fat to increase the fat content of ice cream and produce a "creamy" ice cream. Such products as hydrogenated cottonseed oil, cocoanut oil or soybean oil, or oleomargarine, can be added to an ice cream mix and homogenized therein to supply a fat content.

It will readily be appreciated that the addition of expensive ingredients makes an ice cream costly and reduces its availability to many people who have limited budgets. The cheapest ingredient which can be added to ice cream which has a high food value is milk powder, which consists largely of milk solids-not-fat or serum solids. These serum solids in an average milk powder consist of approximately 39.50 percent protein, 58.00 percent carbohydrate, 1.40 percent calcium, 1.00 percent phosphorous and 0.10 percent iron.

It appears that the protein constituents of the mix are those which enable it to be whipped. These protein constituents must be properly conditioned if we are to obtain a stiff, dry ice cream without the use of gelatine. The popularity of the automobile and the presence of excellent roads in the United States have led to the development of roadside freezer stands selling ice cream directly from freezers. These ice creams are usually low in total solids and are high in filler or stabilizer content, in order that they can be drawn from the freezers in a stiff consistency. The addition of gelatine and other similar fillers not only increases the cost but also reduces the quality of the ice cream.

One object of my invention is to provide a method of confecting a frozen comestible such as ice cream and the like of a stiffer consistency without the use of fillers such as gelatine, gums, locust beans and the like.

Another object of my invention is to provide a method of confection of frozen comestibles whereby they may be drawn directly from a freezer in a drier condition than has been heretofore possible without the use of fillers such as gelatine, locust beans, gums and the like.

Another object of my invention is to provide a composition of matter useful in the confection of frozen comestibles for the carrying out of my method.

Other and further objects of my invention will appear from the following description.

In general my invention contemplates the incorporation of a minute amount of from between 0.10 percent and 0.50 percent by weight of the mix of calcium sulphate and thoroughly disseminating it therethrough. I have found that the addition of a minute amount of calcium sulphate in the mix greatly increases the whipping qualities of the mix and enables me to produce a dry, stiff ice cream directly from a freezer. Furthermore, I am enabled to produce a stiffer ice cream without the use of fillers such as gelatine, gums, locust beans and the like.

I am not certain of the reason why the improved results are obtained. Calcium sulphate is soluble to the extent of about 0.25 percent by weight in cold water. Its solubility may be increased by the presence of other soluble matter, in some cases up to approximately 0.75 percent by weight. Calcium sulphate is a salt of a strong mineral acid and a comparatively feeble base (calcium hydroxide). It appears that when dissolved in water, calcium sulphate will hydrolize. This hydrolitic dissociation may be represented as follows:

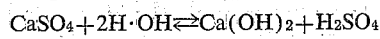

$$CaSO_4 + 2H \cdot OH \rightleftharpoons Ca(OH)_2 + H_2SO_4$$

The solution of calcium sulphate therefore acts as a feeble acid. This feeble acid partially flocculates the protein constituents of the mix and stiffens them. This stiffening cannot proceed to a degree where there is curdling. The stiffening of the casein component of the mix must be carefully controlled. If a strong acid were added, the casein would simply curdle and the whipping qualities would be lost. It would be the same as attempting to whip a boiled white of an egg.

It will be seen that according to my theory what I am doing is partially flocculating the casein constituents to an extent to impart increased stiffness and hence increased whipping qualities to them. The partial flocculation cannot be conducted to an extent where there is curdling.

My theory is borne out by the fact that the addition of calcium sulphate is not effective in the presence of an excess of acid. I have found it is necessary to standardize the mix before the addition of calcium sulphate. This can be done by adding a minor amount of magnesium or calcium hydroxide. The acidity of normal milk as determined by titration with sodium hydroxide using phenolphthalein as an indicator is between 0.14 percent and 0.18 percent (calculated as lactic acid). An acidity figure of 0.19 percent indicates incipient souring. An acidity of below 0.13 percent indicates that the milk has been derived from unhealthy cows or those feeding on improper fodder. I find that uniform results can be achieved by standardizing the mix to an acidity of around 0.15 percent. It can vary slightly from this figure without deleterious results. An acidity between 0.10 percent and 0.20 percent is preferred.

If the milk is more acid than 0.20 percent, the addition of calcium sulphate to the milk will tend to coagulate the casein to more than the desired amount. If the acidity of the milk is less than 0.10 percent, then the flocculation will not proceed to the desired degree. It will be seen, therefore, that my method contemplates the standardization of the mix to an acidity of between 0.10 percent and 0.20 percent. The mix may become acid by bacteriological action, by acidity of the milk powder added or the acidity of other ingredients which have been added to the mix. After the mix has been standardized, an amount of finely divided precipitated calcium sulphate of from 0.10 percent to 0.50 percent by weight of the mix is added to and disseminated through the mix. In view of the small amount of calcium sulphate being added, it is essential that some means be provided to insure its thorough dissemination throughout the mix. I have found that this can be advantageously and conveniently done by thoroughly mixing in dry form the finely divided calcium sulphate with a portion of the sugar normally forming part of the mix. This sugar can be either dextrose or cane sugar or a mixture of dextrose and cane sugar.

It will be seen that thus far it is contemplated in carrying out my method that I standardize the mix after it is formed to an acidity of from 0.10 percent to 0.20 percent, and this can be done by the addition of minor amounts of calcium hydroxide or magnesium hydroxide. I can, in addition, employ magnesium carbonate as the standardizing agent. This compound is only slightly soluble in neutral solvent, and when dissolved, hydrolizes. Since the carbonic acid is a feeble acid, the hydrolitic dissociation will produce a basic or slightly alkaline reaction and the magnesium carbonate may be used to standardize to the desired acidity.

It will be appreciated, furthermore, that in increasing the milk solids-not-fat, I also increase the lactose as well as the casein or protein constituents of the serum solids. Lactose is soluble only to approximately 20.00 percent and an excess of lactose tends to form crystals or lumps of the undissolved lactose. These crystals or lumps produce what is known as "sandiness" in ice cream. "Sandy" ice cream is unpleasant to eat as it tastes gritty to the consumer. Deflocculating the casein in the milk, as described in my Patent 1,935,596, is not feasible with the use of magnesium sulphate since the alkaline deflocculating agents there described will counteract the flocculating effect on the casein which I desire and obtain by the hydrolization of the magnesium sulphate.

Advantageously, therefore, I can convert the excess of lactose into more soluble sugars such as glucose and galactose by the use of lactase, as described in Turnbow Patent 1,737,101.

The addition, for example, of 100 percent of lastase B will convert approximately 25.00 percent of the lactose to glucose and galactose rapidly if the mix is held at pasteurizing temperatures of from 150° F. to 160° F.

ADDITION AGENT 1

An addition agent was formed by thoroughly mixing 2.00 pounds of finely divided precipitated calcium sulphate with 98.00 pounds of dextrose.

ADDITION AGENT 2

An addition agent was formed by mixing 10.00 pounds of precipitated calcium sulphate in finely divided form with 45.00 pounds of sucrose and 45.00 pounds of dextrose.

ADDITION AGENT 3

An addition agent was formed by mixing 17.00 pounds of finely divided precipitated calcium sulphate with 83.00 pounds of sucrose.

*Example I*

It is desired to form a mix having the following solids composition by weight:

| | Percent |
|---|---|
| Butter fat | 12.50 |
| Serum solids | 10.50 |
| Sugar | 14.50 |
| Total solids | 37.50 |

This mix weighs 9.00 pounds per gallon.

Instead of using 14.50 percent of sugar, I first add only 9.50 percent of sugar to the mix. The sugar can be sucrose or dextrose, or any mixture of these. To the mix in a mixing vat I then add 1.00 percent by weight of powdered lactase B concentrate. The ingredients are heated to pasteurization temperature of between 150° F. and 160° F. At these temperatures the enzymatic action will be substantially completed within thirty minutes, and upwards of eighty percent of the lactose will be converted by the enzyme by hydrolization and inversion principally to glucose and galactose, both of which sugars are much more soluble than lactose.

The mixture is then standardized to an acidity of between 0.10 percent and 0.20 percent by means of the addition of magnesium hydroxide, calcium hydroxide or magnesium carbonate or the like. At this point 5.00 percent by weight of Addition Agent 1, above, is added to the mix, that is to say, a mix is formed containing 0.10 percent of calcium sulphate by weight of the mix. It will also be noted that this supplied substantially 5.00 percent of sugar to bring the sugar content of the mix to the 14.50 percent desired.

The mix is then homogenized. I may use a two-stage homogenizer using pressures of two thousand pounds on the first valve and between one thousand pounds and fifteen hundred pounds on the second valve. The homogenization may take between on hour and an hour and a half. The mix may be held at the pasteurization temperature during homogenization thus permitting ample time for the rapid conversion of the lactose to more soluble sugars by the enzyme which has been added. After homogenization, the mix is transferred to the freezers. The freezers may be the direct-expansion type. It will be noted that it is not necessary to age the mix. If the mix is to be used on counters or at roadside freezers the mix may be cooled to 30° F. or 35° F., kept at storage temperatures and delivered as needed. It is to be understood, of course, that fruits, nuts, chocolate or other flavoring may be added to the mix to give any desired flavor.

This mix was then frozen in a freezer and whipped until it weighed 4.50 pounds per gallon. This point was reached when the mix had an overrun of 100 percent. It will be noted that the mix and the ice cream had a solids content of 37.50 percent. With an overrun of 100 percent the solids content of the finished ice cream was 1.69 pounds per gallon, neglecting the weight of any flavoring or nuts or fruits, which may be added to the mix as desired.

The ice cream had no filler of any kind and was stabilized by the natural milk protein conditioned to the proper degree of flocculation by the addition of the calcium sulphate. A smooth, heavy, rich ice cream, having a high protein level and a high nutritional value, was produced. This ice cream readily melted at room temperature because of the absence of any binder or filler. The high protein content of the ice cream made the food value exceptionally excellent since high protein foods are not conducive to obesity.

*Example II*

A second mix was prepared having a solids content of the following composition, the percentages being by weight of the mix:

| | Percent |
|---|---|
| Butter fat | 12.50 |
| Serum solids | 14.50 |
| Sugar | 14.50 |
| Total solids | 41.50 |

4.00 percent by weight of the mix of the sugar was supplied at a subsequent time by the use of Addition Agent 2, above; that is to say, the same procedure was followed as in the case of Example I. Instead of 14.50 percent by weight of sugar only 10.50 percent by weight was originally used in first forming the mix in the mixing vat.

After the mix was formed in the mixing vat and pasteurized and the lactose partially converted and standardized, the above mentioned 4.00 percent by weight of Addition Agent 2 was added, thus, in effect, adding 0.40 percent calcium sulphate to the mix. The mix weighed 9.25 pounds per gallon. It was cooled and whipped while being frozen until the finished ice cream had a weight of 4.50 pounds per gallon. At this point the ice cream had an overrun of 105.55 percent. It will be observed that the finished ice cream had a solids content of 1.87 pounds per gallon. The original mix and the ice cream had a solids content of 41.50 percent. This ice cream was smooth and rich. The weight per gallon of the ice cream was the same as in Example I. The ice cream of this Example II was dry and stiff as it was extruded from the freezer. Since there was no binder or filler in the mix, it melted down readily at room temperature to the original mix. The absence of fillers, the dryness of the ice cream and its high solids content gave this ice cream a very rich taste.

*Example III*

A third mix was prepared, the ultimate constituents of which were as follows by weight:

| | Percent |
|---|---|
| Hydrogenated cottonseed oil | 4.00 |
| Butter fat | 8.00 |
| Serum solids | 15.00 |
| Sugar | 12.00 |
| Addition Agent 3, above | 3.00 |
| Total solids | 42.00 |

The ingredients of the mix, except Addition Agent 3, were mixed as before, pasteurized and treated with lactase B to reduce the lactose content of the very high concentration of serum solids. It will be noted that the solids content of this mix is 42.00 percent. After the mix was standardized and Addition Agent 3 added to the mix, the mix weighed 9.50 pounds per gallon and contained 0.50 percent of calcium sulphate. This mix was cooled and frozen into an ice cream and drawn from the freezer at a weight of 4.50 pounds per gallon, giving the ice cream an overrun of 111.11 percent. It will be observed that even with this overrun the finished ice cream had a solids content of 1.89 pounds per gallon, which was almost the same solids content which we had in Example II. This ice cream, like those in the other examples, was a dry, stiff ice cream.

If desired, a portion of the serum solids may be supplied by cultured milk powder which is shown and described in copending application of Ernest D. Fear et al., Serial No. 182,244, filed August 30, 1950, now Patent No. 2,671,729. This portion may be 3.00 percent of the weight of the mix, that is, about 20.00 percent of the serum solids requirements of the mix.

In a control test made with all three examples, in which sugar was added to the right amount but no calcium sulphate added, the ice cream drawn from the freezer had a soft consistency and was not very palatable. It was the type of ice cream which is served at roadside stands, which it is the object of this invention to improve. The whippability of the mix without the addition of calcium sulphate was remarkably absent. The surprising and unexpected results which I obtain by the addition of such a small amount of calcium sulphate appears to be logically accounted for by the explanation given above. It is understood, of course, that I do not wish to be bound by the theory which I have advanced.

In the art, the homogenized mix is usually cooled in a tubular cooler to a temperature in the vicinity of 40° F. before it is passed into the freezers. Modern freezers are of the direct-expansion type and permit the ice cream to be frozen at such low temperatures as −20° F. At these low temperatures there is no difficulty in getting a dry, stiff ice cream even with high-solids mixes. With the use of my invention, however, in which the caseinates or protein constituents of the mix are partially flocculated or thickened, stiff, dry ice cream having the consistency of taffy, for example, can be drawn directly from counter freezers such as used by roadside operators, at temperatures in the vicinity of 0° F. A high quality of ice cream using no fillers is thus made available to the public.

It will be further understood, of course, that small amounts of fillers may be employed to augment the stiffness if higher temperatures are to be employed. For example, by the use of 0.50 percent of gelatine in the mixes in Examples I and II, a stiff ice cream can be drawn directly from a counter-type freezer at a temperature of 10° F. This can be used on a busy day when freezers are being operated to capacity.

It will be seen that I have accomplished the objects of my invention. I have provided a method of confection of frozen comestibles such as ice cream and a novel composition of matter useful in carrying out the process. I have provided a method of making ice cream and other frozen comestibles of a stiffer consistency without the use of fillers such as gelatine, gums, locust beans and the like. My method of confection of ice cream enables a dry, stiff ice cream to be drawn directly from the freezer without the necessity of subjecting the mix to a long aging process before subjecting it to whipping. The frozen comestibles made in accordance with my method are smooth, heavy, and may have a high protein level and a high nutritional value. The absence of any fillers enables the ice cream to retain a desirable melting point.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. The method of confection of frozen comestibles including the steps of forming a mix, standardizing the mix to an acidity of between 0.10 percent and 0.20 percent by the addition of an alkaline agent, disseminating throughout the mix from 0.10 percent to 0.50 percent by weight of the mix of calcium sulphate, then freezing the mix while whipping it to produce the desired frozen comestible.

2. The method of confection of frozen comestibles including the steps of forming a mix, standardizing the mix by the addition of minor amounts of an alkaline reagent selected from the class consisting of magnesium hydroxide, calcium hydroxide and magnesium carbonate to an acidity between 0.10 percent and 0.20 percent, disseminating throughout the mix from 0.10 percent to 0.50 percent by weight of the mix of calcium sulphate, then freezing the mix while whipping it to produce the desired frozen comestible.

3. The method of confection of frozen comestibles including the steps of forming an ice cream mix containing milk solids-not-fat, disseminating one percent by weight of the mix of lactase throughout the mix, heating the mix at pasteurization temperature to convert a portion of the lactose in the milk serum solids to more soluble sugars by enzymatic action, standardizing the mix to an acidity between 0.10 percent and 0.20 percent, disseminating between 0.10 percent and 0.50 percent by weight of the mix of calcium sulphate throughout the mix and freezing the mix while whipping it to form the desired frozen comestible.

4. The method of confection of frozen comestibles including the steps of forming an ice cream mix containing milk solids-not-fat, disseminating one percent by weight of the mix of lactase throughout the mix, heating the mix at pasteurization temperature of between 150° F. and 160° F., homogenizing the mix at pasteurization temperature to convert a portion of the lactose in the milk serum solids to more soluble sugars by enzymatic action, standardizing the mix to an acidity between 0.10 percent and 0.20 percent, disseminating between 0.10 percent and 0.50 percent by weight of the mix of calcium sulphate throughout the mix and freezing the mix while whipping it to form the desired frozen comestible.

5. A method as in claim 4 in which the standardizing step includes adding magnesium carbonate to the mix.

6. A method as in claim 4 in which the step of forming the ice cream mix includes adding a lactic acid bearing milk powder to the mix as a portion of the milk solids-not-fat.

7. A method as in claim 4 in which the step of forming the mix includes adding an edible vegetable fat to the mix.

References Cited in the file of this patent

UNITED STATES PATENTS

| 1,424,603 | Turney | Aug. 1, 1922 |
| 1,737,101 | Turnbow | Nov. 26, 1929 |
| 2,103,411 | Frieden et al. | Dec. 28, 1937 |